(12) United States Patent
Uttaro et al.

(10) Patent No.: US 10,447,499 B2
(45) Date of Patent: Oct. 15, 2019

(54) VIRTUAL PRIVATE NETWORK INTERWORKING

(71) Applicant: AT&T Intellectual Property I, L.P., Atlanta, GA (US)

(72) Inventors: James Uttaro, Staten Island, NY (US); Tuan Duong, Eatontown, NJ (US); Han Nguyen, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 40 days.

(21) Appl. No.: 15/727,250

(22) Filed: Oct. 6, 2017

(65) Prior Publication Data
US 2019/0109730 A1    Apr. 11, 2019

(51) Int. Cl.
| | | |
|---|---|---|
| *H04L 12/46* | (2006.01) | |
| *H04L 12/715* | (2013.01) | |
| *H04L 12/723* | (2013.01) | |
| *H04L 12/741* | (2013.01) | |
| *H04L 12/771* | (2013.01) | |
| *H04L 12/721* | (2013.01) | |

(52) U.S. Cl.
CPC ...... *H04L 12/4633* (2013.01); *H04L 12/4641* (2013.01); *H04L 45/50* (2013.01); *H04L 45/64* (2013.01); *H04L 45/54* (2013.01); *H04L 45/56* (2013.01); *H04L 45/68* (2013.01)

(58) Field of Classification Search
CPC . H04L 12/4633; H04L 12/4641; H04L 12/04; H04L 45/50; H04L 45/64
See application file for complete search history.

(56) References Cited

U.S. PATENT DOCUMENTS

| | | |
|---|---|---|
| 7,436,782 B2 | 10/2008 | Ngo et al. |
| 7,478,167 B2 | 1/2009 | Ould Brahim et al. |
| 7,633,954 B2 | 12/2009 | Wakayama et al. |
| 7,733,869 B2 | 6/2010 | Fischer et al. |
| 7,978,602 B2 | 7/2011 | Rijsman |
| 8,018,880 B2 | 9/2011 | Figueira et al. |
| 8,040,820 B2 | 10/2011 | Pratap et al. |
| 8,144,715 B2 | 3/2012 | Ould Brahim et al. |
| 8,724,627 B2 | 5/2014 | Filsfils et al. |
| 8,958,431 B2 | 2/2015 | Zhang |
| 8,971,338 B2 | 3/2015 | Mishra et al. |
| 9,036,644 B2 | 5/2015 | Agmon et al. |
| 9,077,632 B2 | 7/2015 | Ding et al. |
| 9,100,316 B2 | 8/2015 | Bragg et al. |

(Continued)

FOREIGN PATENT DOCUMENTS

KR    10-1664436 B1    10/2016

OTHER PUBLICATIONS

Shetty et al.; "BGP-EVPN for the Data Center and L3 DCI"; Cisco; Nov. 2015; 20 pages.

(Continued)

*Primary Examiner* — Wei Zhao
(74) *Attorney, Agent, or Firm* — BakerHostetler

(57) ABSTRACT

Methods and systems may use a software-defined network (SDN) based approach for interworking different types of nodes. In an example, an SDN controller may include components that assist in building pseudowires across Ethernet virtual private network (EVPN) nodes and Border gateway protocol-virtual private local area network (LAN) service (BGP-VPLS) nodes.

19 Claims, 14 Drawing Sheets

(56) References Cited

U.S. PATENT DOCUMENTS

| | | | |
|---|---|---|---|
| 9,270,581 | B2 | 2/2016 | Guellal et al. |
| 9,450,817 | B1* | 9/2016 | Bahadur ................. H04L 45/64 |
| 9,596,169 | B2 | 3/2017 | Choudhury et al. |
| 2006/0209886 | A1 | 9/2006 | Silberman et al. |
| 2010/0287405 | A1 | 11/2010 | Soon |
| 2011/0235599 | A1* | 9/2011 | Nam ..................... H04L 1/0027 370/329 |
| 2012/0207171 | A1 | 8/2012 | Ould Brahim et al. |
| 2013/0235875 | A1 | 9/2013 | Mohan et al. |
| 2013/0308617 | A1 | 11/2013 | Chuah et al. |
| 2014/0010112 | A1 | 1/2014 | Soon et al. |
| 2016/0036620 | A1 | 2/2016 | Dunbar et al. |
| 2016/0316011 | A1 | 10/2016 | Venkataraman et al. |
| 2019/0028381 | A1* | 1/2019 | Li .......................... H04L 29/06 |

OTHER PUBLICATIONS

"LDP-BGP VPLS Interworking"; Juniper Networks, Inc.; White Paper; © 2010; 35 pages.

"Ethernet VPN (EVPN) and Provider Backbone Bridging-EVPN: Next Generation Solutions for MPLS-based Ethernet Services"; Cisco; White Paper; © 2014; 10 pages.

"TR-350 Ethernet Services using BGP MPLS Based Ethernet VPNs (EVPN)"; Technical Report Issue 01; Nov. 2015; Broadband; 43 pages.

* cited by examiner

VIRTUAL PRIVATE NETWORK INTERWORKING

BACKGROUND

Most local area networks (LANs) in today's network are based on Ethernet technology. Ethernet services, which were for local networks, now can be used over a wide area network. Border gateway protocol-virtual private local area network (LAN) service (BGP-VPLS) became a widely used technology, which allows for multi-point services using what was traditionally a local area network technology. Now, the industry has developed the Ethernet virtual private network (EVPN) technology that may provide the same features as BGP-VPLS and more at better scale and performance. BGP-VPLS and EVPN are different in several ways; therefore, there is a need to develop a way to interwork the BGP-VPLS technology and EVPN technology.

SUMMARY

In recent years, industry has developed the EVPN technology, which can provide the same features as BGP-VPLS and more, which may be at better scale and performance. However, the industry does not specify a way to interwork these two technologies and leaves it open to the provider and equipment manufacturer to work out how this may be accomplished. Disclosed herein is a software-defined network (SDN) based approach for interworking EVPN and VPLS.

In an example, an apparatus may include a processor and a memory coupled with the processor that effectuates operations. The operations may include obtaining a control message that is advertised from a border gateway protocol-virtual private local area network service (BGP-VPLS) node; parsing for first information in the control message, the first information including control information associated with routing data messages to the BGP-VPLS node; and converting the first information to second information, the second information includes control information for forwarding Ethernet virtual private network (EVPN) data messages to the BGP-VPLS node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1A:
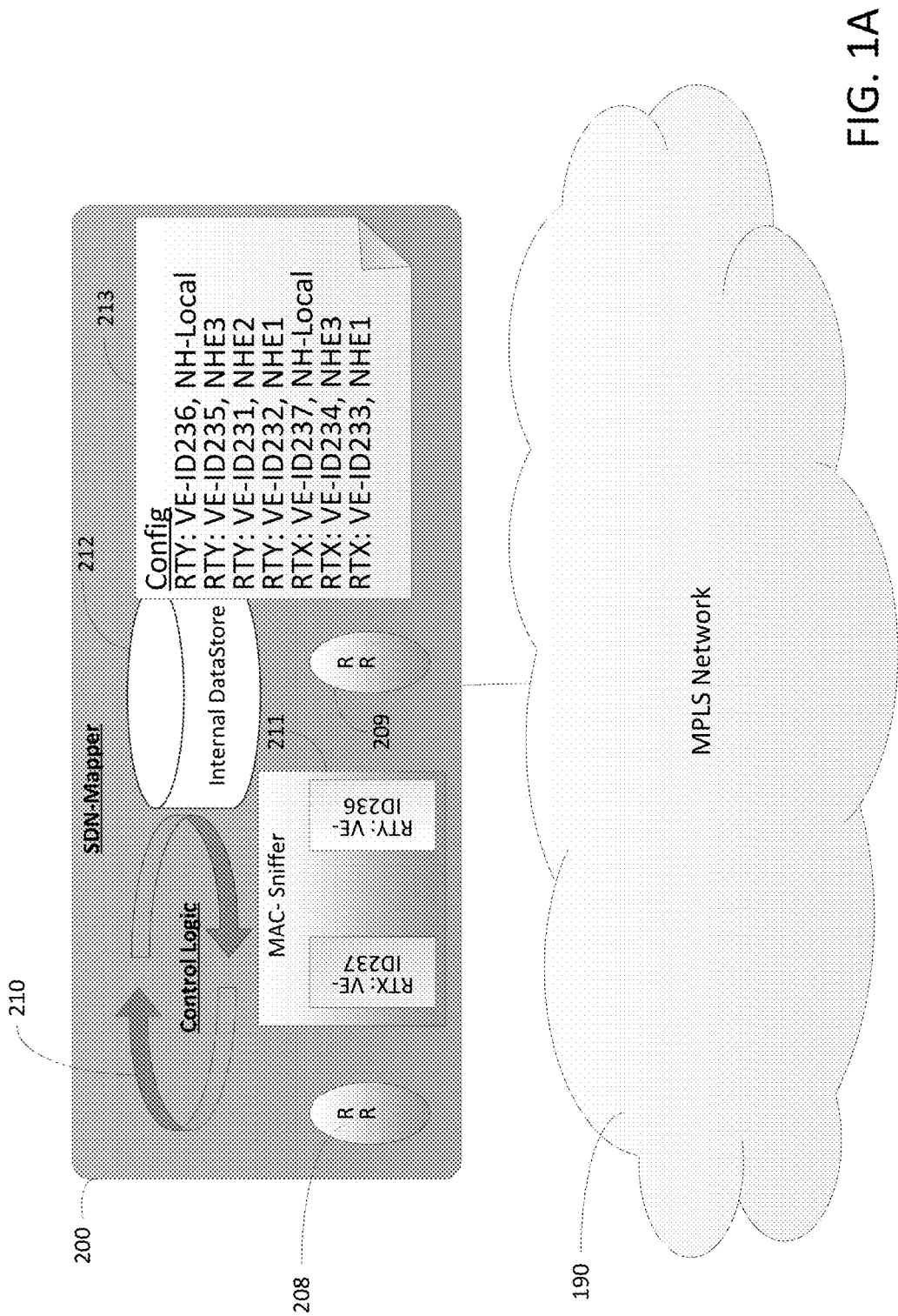
FIG. 1A illustrates an exemplary network that may include an SDN-mapper component.

There are many different VPN technologies in existence today. In recent years, industry has developed the EVPN technology, which can provide the same features as BGP-VPLS and more, which may be at better scale and performance. However, the industry does not specify a way to interwork these two technologies and leaves it open to the provider and equipment manufacturer to work out how this may be accomplished. Disclosed herein is a software-defined network (SDN) based approach for interworking different virtual private networks, such as EVPN and VPLS.

Border gateway protocol-virtual private local area network (LAN) service (BGP-VPLS) has been implemented for a number of years. Now, Ethernet virtual private network (EVPN) technology has been developed to provide the same features as BGP-VPLS at better scale and performance. However, the industry does not specify a way to interwork these two technologies and leaves it open to the provider and equipment manufacturer to work out how this may be accomplished. Disclosed herein is a software-defined network based approach for interworking BGP-VPLS and EVPN-MPLS.

BGP-VPLS (also referred to herein as VPLS) and EVPN (also referred to herein as EVPN-MPLS) technology have a control plane and a data plane. Control plane may be considered language and intent while data plane represents the physical work of moving the packet from point A to B. The language, how the intention is exchanged, is different between BGP-VPLS and EVPN while the actual forwarding, though not identical, is very similar for the multi-point case. SDN-Mapper, as disclosed herein, may leverage this similarity in the data plane and constancy of intent by translating between the languages so the intent may be understood on either side (BGP-VPLS or EVPN). As further described herein, once an SDN-Mapper configures the control plane, a BGP-VPLS speaking node may send traffic directly to an EVPN speaking node. The SDN-Mapper is generally not in the path of the traffic forwarding.

Table 1 provides exemplary differences between EVPN-MPLS versus BGP-VPLS. While Table 2, includes exemplary SDN-Mapper tasks that help provide interworking of EVPN-MPLS and BGP-VPLS. The SDN-Mapper may be integrated into an SDN-Controller that translates the information in the control plane as much as possible to preserve the intrinsic behavior of BGP-VPLS nodes and EVPN-MPLS nodes. The use of the SDN-Mapper may minimize the need to make new development on the BGP-VPLS nodes in order to interwork it with EVPN-MPLS. Depending upon implementation, additional knobs may be needed on the EVPN-MPLS nodes.

With reference to the aforementioned knobs, EVPN-MPLS sends Unicast traffic using a label (U-PW) that is different from the label for BUM (Broadcast, Unknown Unicast, Multicast) traffic (PMSI-PW). Because the distinction of label for the traffic type, an EVPN implementation may use a "short-cut" by matching a PMSI-PW Label, in which it does not have to process the MAC header information below the label and automatically replicates the packet to all egressing interfaces belonging to the same bridge-domain. The knob is to override this "short-cut" behavior so it processes the MAC header information first in order to determine if it is a BUM packet and act accordingly.

TABLE 1

Differences in EVPN-MPLS vs BGP-VPLS

| Category | EVPN-MPLS | BGP-VPLS |
| --- | --- | --- |
| Control Plane | BGP-EVPN Address Family | BGP-VPLS Address Family |
| Pseudowire | Egress-Based | Ingress-Based |
| Traffic Forwarding | Unicast Traffic sent over U-PW BUM over PMSI-PW | Unicast and BUM use same pseudowire |
| MAC Learning | MAC Learning and Distribution via BGP: RX-Ingress Sniff Source MAC addresses coming over connected interfaces, and send the MAC routes in a BGP Update as needed to the all Nodes. | MAC Learning via Data Plane: RX-Ingress and TX-Egress Sniff Source MAC addresses coming over connected interfaces or pseudowires to construct and refresh MAC Table |
| Redundancy | Supports All-Active and Active-Backup. All-Active Supports needs to deal with split-horizon and Designated Forwarder issues. | Supports Active-Backup |

TABLE 2

Example SDN-Mapper Tasks

| Category | SDN-Mapper |
| --- | --- |
| Control Plane | Translate Message Content between two syntax |
| Pseudowire | Label Value Mapping |
| Traffic Forwarding | Maps Label value for U-PW = PMSI-PW = PW for intrinsic Data Plane Mac Learning on VPLS nodes |
| MAC Learning | Sniff Source MAC coming from VPLS Nodes and converts into EVPN Type2 MAC routes for each VPN and send to each EVPN Nodes |
| Redundancy | Maps EVPN All-Active and Active Backup to VPLS Active-Backup with VPN based hashing to balance load. |

In other solutions (e.g., non-SDN-Mapper solutions) with regard to interworking (described in more detail further below), the control plane and data plane are tightly coupled and customer traffic flows through the node that provides the interworking solution. The SDN-Mapper implementation allows for decoupling of the control plane from the data plane so that the bulk of customer (e.g., data) traffic flows directly between the VPLS and EVPN nodes. Because of these attributes, a network service overlay boundary no longer exists. Switched Ethernet VPN may be instantiated on the EVPN or VPLS nodes.

FIG. 1A illustrates an exemplary network that may include an SDN-mapper component. Discussed below are exemplary components of SDN-Mapper 200 that may assist in building pseudowires across EVPN (used interchangeably with EVPN-MPLS) and VPLS (used interchangeably with BGP-VPLS) speakers. SDN-Mapper 200 may include RR 208, RR 209, control logic 210 (e.g., a processor), MAC-Sniffer 211, or internal data store 212 that includes configuration file 213. RR 208 may be a route reflector to each VPLS speaker, in which it advertises adjusted label base value from EVPN nodes (e.g., E204, E205, E206) to each VPLS node (e.g., V201, V202, or V203 separately sent). RR 209 may be a route reflector to each EVPN speaker, in which it advertises adjusted label value from each VPLS node to each EVPN node (e.g., E204, E205, or E206). Configuration file 213 of internal data store 212 may include per virtual private network (VPN) configuration to assign VPLS Endpoint ID (VE ID) on each EVPN Node. MAC-Sniffer 211 may include virtual routing and forwarding (VRF) in VPLS domain to sniff MAC addresses and convert to BGP MAC address advertisement. Control Logic 210 may use information from other SDN-Mapper 200 components (e.g., configuration file 213, RR 208, RR 209, or MAC-Sniffer 211) to translate the label values built across pseudowires and to advertise VPLS MAC learning into EVPN BGP MAC address advertisements. As disclosed in more detail herein SDN-Mapper 200 may be implemented different ways to interwork the EVPN and VPLS technologies. Also, with reference to translating the label values build across pseudowires, in order to correctly convert the information from EVPN nodes into messages that VPLS nodes can understand and use to forward packets directly to EVPN nodes, additional instructions are needed to tell the SDN-Mapper how to convert this information. These instructions are embedded in configuration file 213, and the state information in RR208 and RR209. This instructional data is used for converting information from VPLS nodes into messages that EVPN nodes can process to forward traffic directly to VPLS nodes.

Functionality of SDN-Mapper 200 may be scaled out to a plurality of SDN-Mappers 200 for resiliency and capacity. SDN-Mapper 200 may be connected with a network, such as MPLS network 199. SDN-Mapper 200 may have a VPLS-route reflector (RR) 207 function and EVPN-RR 216 function that allows the SDN-Mapper to peer with VPLS nodes and EVPN nodes in which a switched Ethernet service may be instantiated. SDN-Mapper 200 may include MAC Sniffer 211. For further clarification, SDN-Mapper 200 should get the information from the VPLS nodes and EVPN nodes and distribute the translated information to these nodes. Route-Reflection is a mechanism that may be used in networks to exchange information between nodes speaking the same language (e.g., BPG-VPLS).

MAC Sniffer 211 may be considered a VPLS-Node that functions as a site (VPLS VE-ID) for each VPN that spans the VPLS nodes and EVPN nodes. MAC Sniffer 211 learns the MAC addresses in the VPLS nodes and then SDN-Mapper 200 may translate the MAC addresses to a BGP-EVPN Type 2 MAC advertisement for the EVPN nodes. When SDN-Mapper 200 is scaled out, the VPLS VE-ID (or referred herein as VE-ID) of MAC Sniffer 211 should be unique within the VPLS domain. Configuration file 213 (or referred herein as config file) may hold the VPLS VE-ID for the VPN site instantiated on a specific EVPN Node for the VPN that spans the VPLS and EVPN nodes. This may occur during provisioning (e.g., customer provisioning) and move, add, change, and delete (MACD). In FIG. 1A, for example, config file 213 includes a listing of VPNs of RTY and RTX. For each VE-ID there is next hops listed. SDN-Mapper 200 uses the information provisioned here to map the label values in control logic 210 so the EVPN and VPLS nodes may build pseudowires directly to each other. A local forwarding knob enhancement may be needed on the EVPN nodes for BUM traffic received on U-PW.

U-PW is a notation used in this document to indicate the label value an EVPN node allocated in its memory to receive unicast traffic from other EVPN nodes. PMSI-PW refers to the label value an EVPN node allocated in its memory to receive BUM traffic from other EVPN nodes. The issue is when a VPLS node sends BUM traffic directly to an EVPN node. Since VPLS node behavior does not distinguish between Unicast and BUM traffic, in a steady state (after SDN-Mapper 200 translates the control messages), the VPLS nodes will forward BUM traffic to EVPN nodes on the U-PW. A knob may be used here to override any "short-cut" behavior (explained earlier) so that when the EVPN node inspects the MAC header and does not match the entries in its memory, it does not discard the packet but rather treats it as BUM and processes accordingly.

Figure 1B:
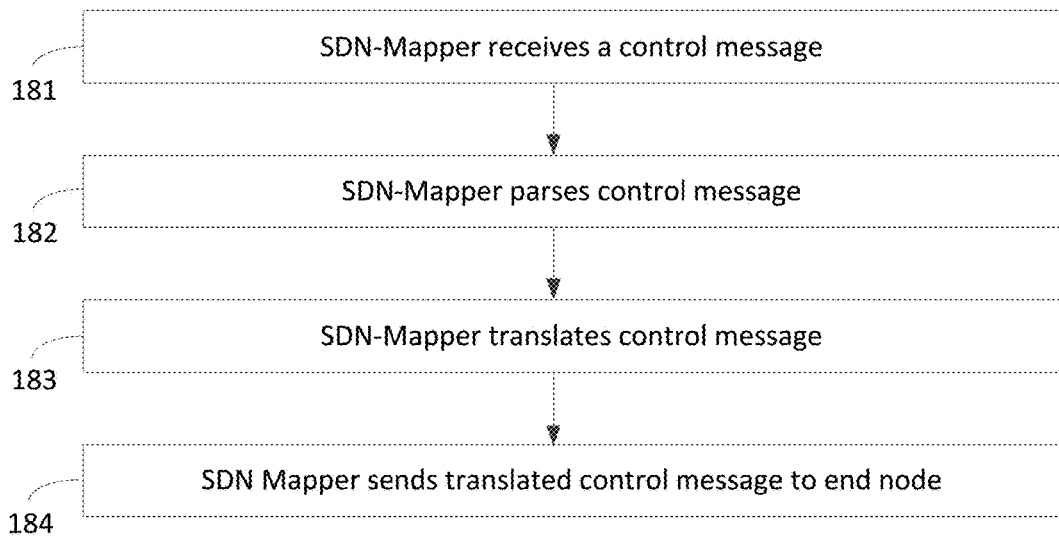
FIG. 1B illustrates an exemplary may that may include an SDN-mapper component for VPLS and EVPN interworking.

FIG. 1B illustrates an exemplary method for VPLS and EVPN interworking using SDN Mapper. SDN-Mapper 200 may be integrated into an SDN-Controller that translates the information in the control plane as much as possible to preserve the intrinsic behavior of BGP-VPLS nodes and EVPN-MPLS nodes. At step 181, SDN-mapper 200 receives a control message that is advertised from VPLS node (e.g., V201) for EVPN node (e.g., E204) for a particular route target (RT), such as RTX (CEX 221 or CEX 223). At step 182, SDN-Mapper 200 parses the information from the control message received at step 181. The SDN-Mapper 200 may determine from the parsed information certain information relevant to the conversion process regarding forwarding (e.g., routing) of data in a network (e.g., MPLS network 190), which may include route target attribute, next-hop, VE-ID, label base, offset, or label value, community values, or other attributes. At step 183, SDN-Mapper 200 appropriately translates the information parsed (e.g., information determined to be relevant to the conversion process) at step 182. SDN-Mapper 200 may create a table (or the like) that translates (e.g., converts) EVPN or VPLS control information (e.g., routing information) to the control information of VPLS or EVPN, respectively. At step 184, after the appropriate control information is determined at step 183, SDN Mapper 200 sends the appropriate node (e.g., E204 or V201) control information (e.g., Table 2) that will allow a sending-node to route data to an EVPN node (if the sending-node is a VPLS node) or a VPLS node (if the sending-node is an EVPN node). This method allows the native EVPN or VPLS nodes (e.g., E204 or V201) to continue operating as designed.

Figure 1C:
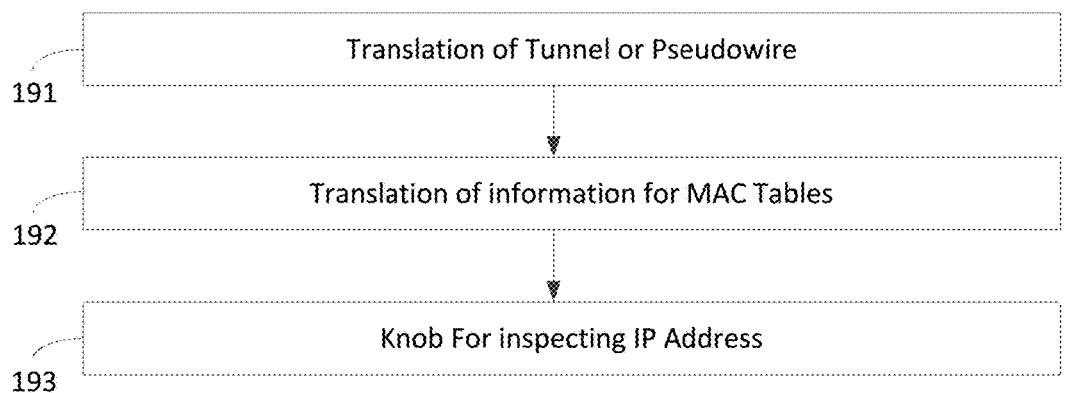
FIG. 1C illustrate exemplary overview of steps that may be performed in this SDN-Mapper approach for EVPN and VPLS interworking.

FIG. 1C illustrate a number of general steps that may be performed in this SDN-Mapper approach for EVPN and VPLS interworking as disclosed herein. These steps do not necessarily occur in the order provided. The first general step 191 may be the translation of "Tunnel or Pseudowire" routes between the EVPN and VPLS nodes so the label paths are built between EVPN and VPLS nodes to transport packets. Translation of VPLS Pseudowire routes into EVPN Tunnel Label routes is a first sub-step of 191. This is covered by FIG. 2A and FIG. 2B. The second sub-step of 191 is Translation of EVPN Tunnel Label routes PMSI (for BUM) into VPLS Pseudowire routes, which is covered by FIG. 3A and FIG. 3B.

Figure 3A:
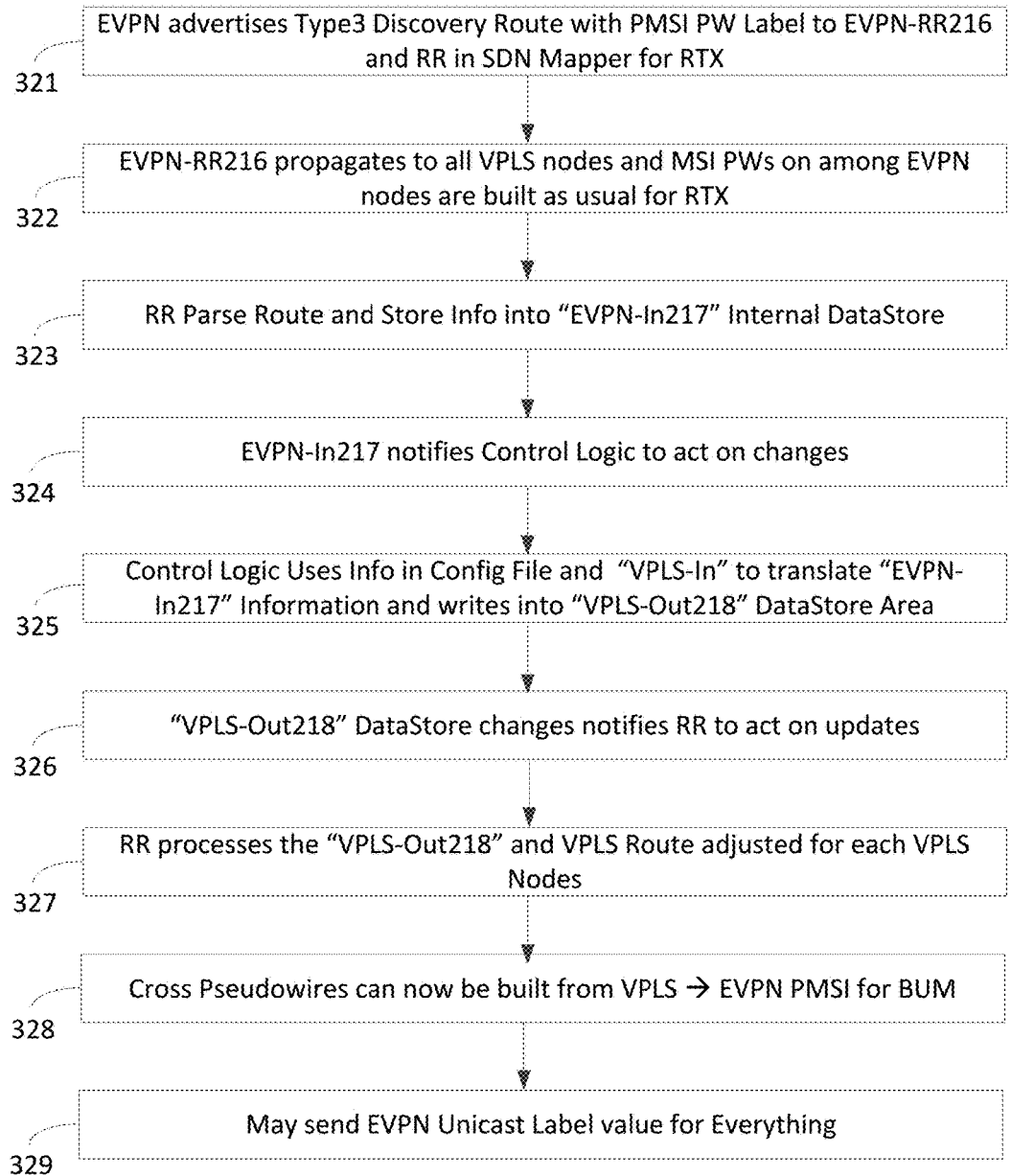
FIG. 3A illustrates an exemplary method for SDN-Mapper Label Advertisement translation to enable pseudowires for VPLS to EVPN (PMSI).
Figure 3B:
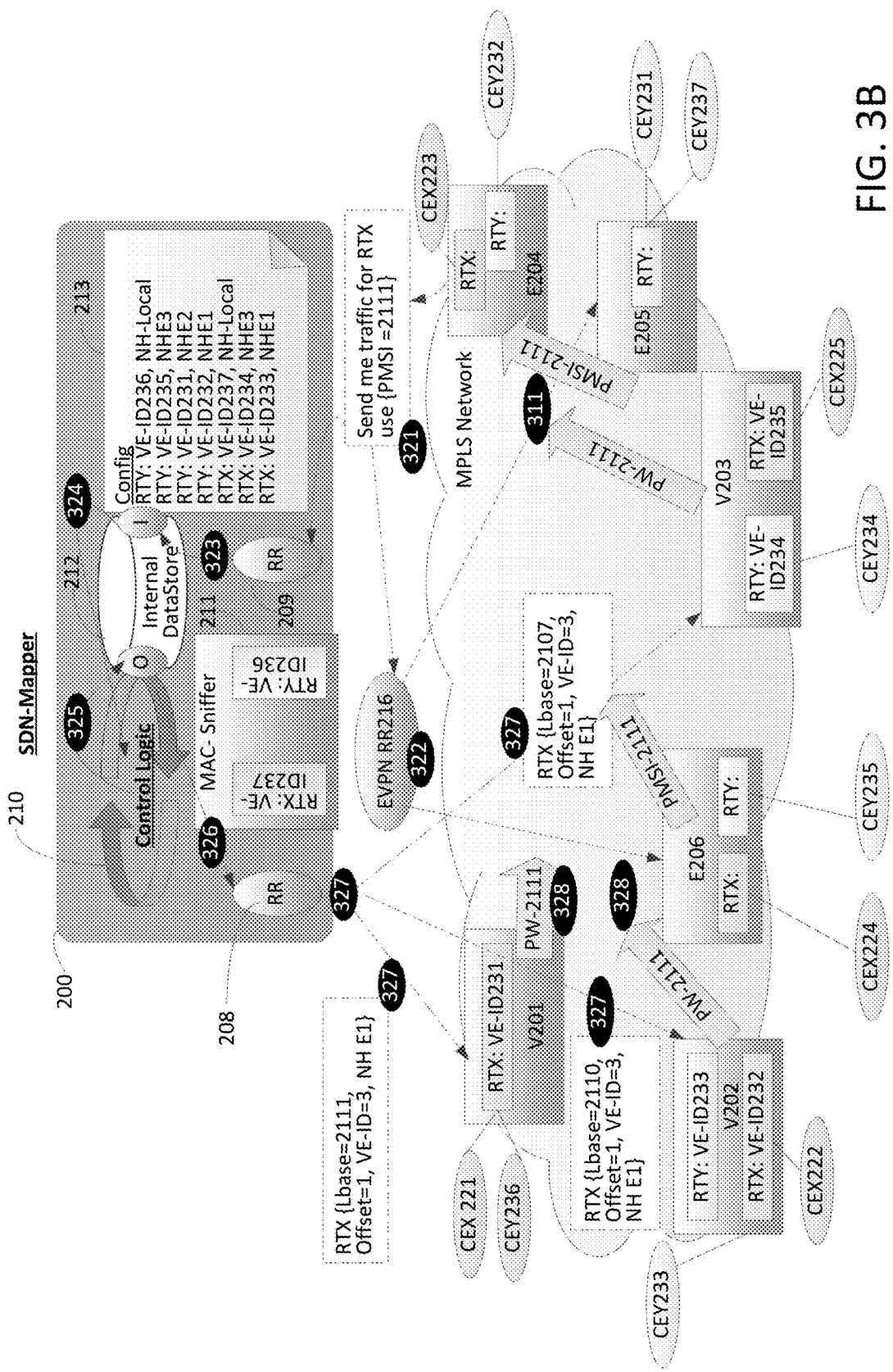
FIG. 3B illustrates an exemplary network in which the method of FIG. 3A (and further disclosed below) may be implemented.

The second general step 192 is the translation of information so that the MAC tables are built correctly. Translation of MAC information coming from VPLS nodes and sending this to the EVPN nodes is covered by FIG. 4A and FIG. 4B (e.g., VPLS 4 EVPN under 192). Also under step 192 there is translation of MAC information coming from EVPN nodes and sending this to the VPLS nodes (e.g., EVPN→VPLS under 192). EVPN→VPLS under 192 has the following: 1) BUM comes from CE connected EVPN node (FIG. 5a, FIG. 5B); and 2) SDN Mapper advertising (FIG. 6A and FIG. 6B). For 2) above, the SDN Mapper has to advertise a new Label route (Unicast Label) to overwrite the previously advertised PMSI route (FIG. 3A, FIG. 3B). This is where the SDN mapper will give new translated information to VPLS nodes to switch to using a unicast label to send to EVPN nodes. This is described in FIG. 6A and FIG. 6B. In the MAC advertisement from the EVPN node, there is an associated Unicast label. This step 2) would extract unicast label in this MAC advertisement, make the correct translation to advertise out a new route similar to the one in FIG. 3A/FIG. 3B.

Figure 2A:
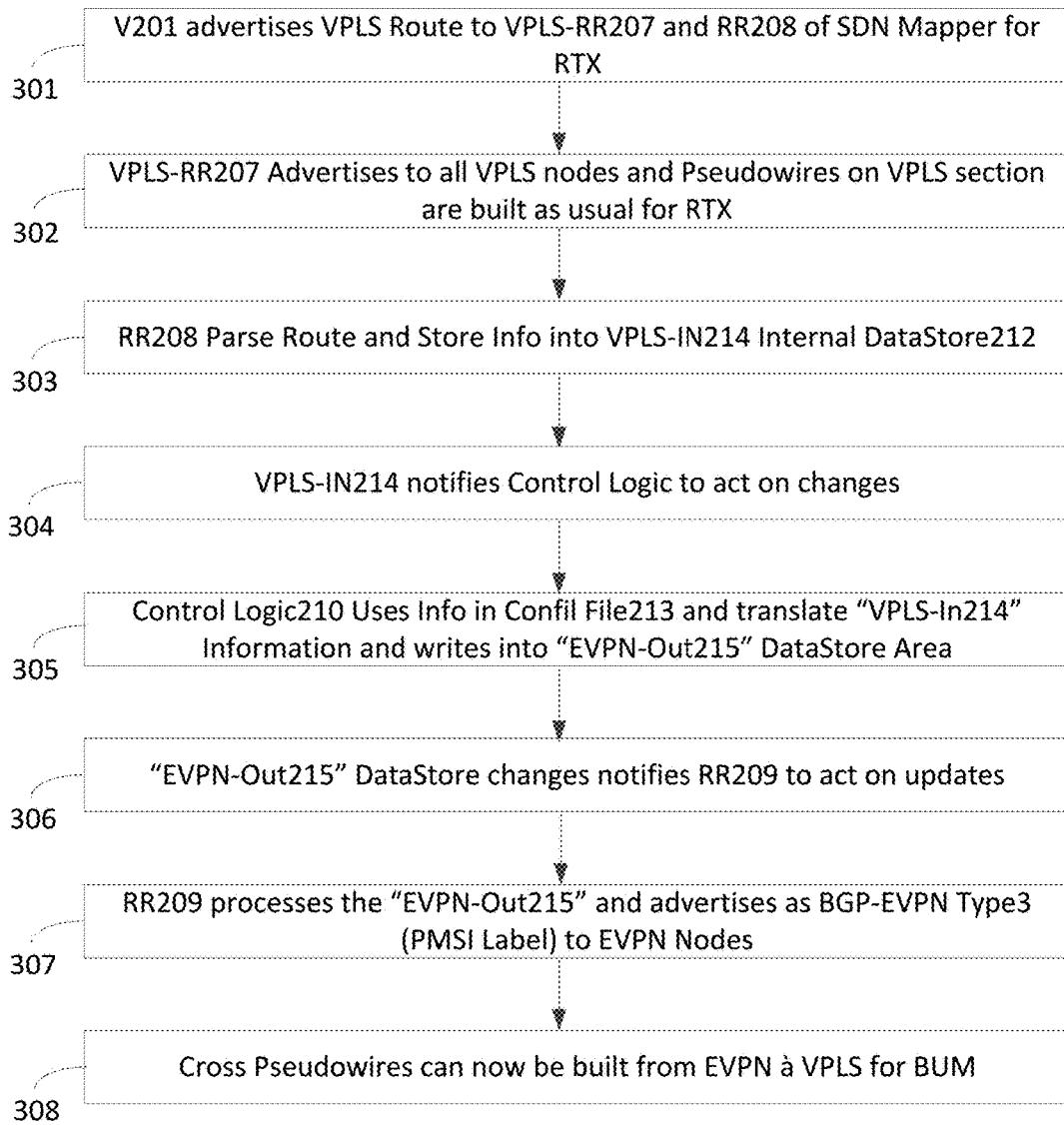
FIG. 2A illustrates an exemplary method for SDN-Mapper label advertisement translation to enable pseudowires for EVPN to VPLS.
Figure 2B:
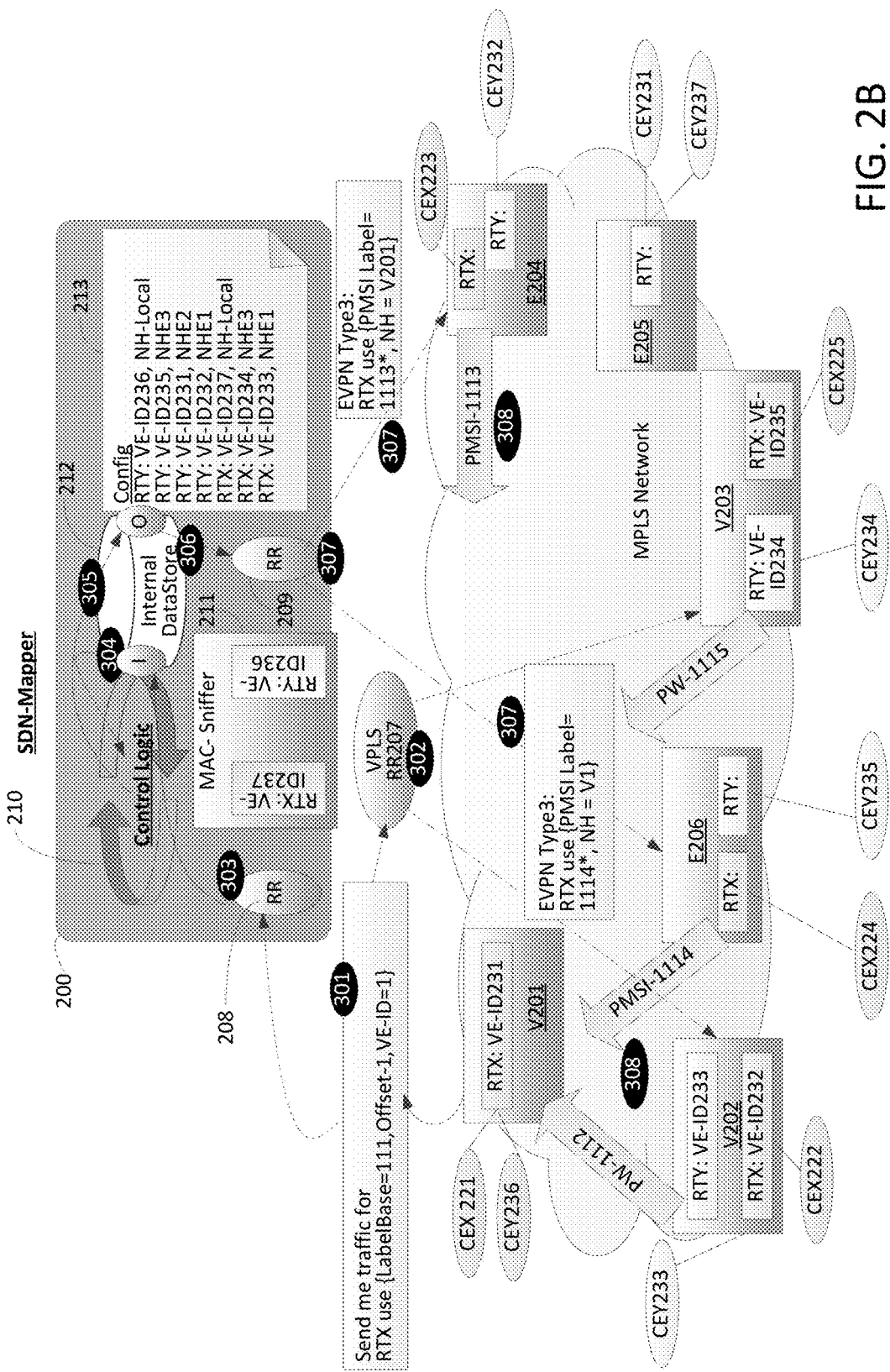
FIG. 2B illustrates an exemplary network in which the method of FIG. 2A may be implemented.

With continued reference to FIG. 1C, there is a general step 193 associated with a knob. Now if BUM comes from VPLS nodes, it may arrive at EVPN nodes on a Unicast label rather than PMSI label. This is where a knob is used in the EVPN node in order to inspect the MAC address and forward based on that inspection. If there is no match against its local MAC table for that VPN, then the knob is that it should treat it as a BUM rather than discarding the packet FIG. 2A illustrates an exemplary method for SDN-Mapper label advertisement translation to enable pseudowires for EVPN to VPLS. FIG. 2B illustrates an exemplary network in which the method of FIG. 2A (further disclosed below) may be implemented. At step 301, V201 (e.g., a network device) may advertise a VPLS route to VPLS-RR 207 (e.g., a router reflector for VPLS not located on SDN-Mapper 200) and route reflector (RR) 208 of SDN-Mapper 200 for RTX. As shown in an example for step 301 in FIG. 2B, an advertisement may include a request for traffic for RTX to use {LabelBase=111, Offset=1, VE-ID=231}. V201 may be a physical or virtual network device (e.g., router or switch) that particularly runs a VPLS scheme. RTX and RTY may be considered different VPNs or the like. For example, RTX may correspond to a private network of a first business customer with multiple sites across the United States and RTY may correspond to a private network of a second business customer with multiple sites.

With continued reference to FIG. 2A and FIG. 2B, at step 302, VPLS-RR 207 advertises to the VPLS nodes (e.g., V201, V202, and V203). Pseudowires in the VPLS section of the network may be built for RTX using conventional methods. At step 303, RR 208 may parse the route of step 301 and stores info into VPLS-In 214 of internal datastore 212. The parsing may be for information relevant to the conversion process, which includes for example Route Target attribute, Next-Hop, VE-ID, Label Base, Offset, or Label Value, community values, or other attributes. VPLS-IN indicate an area of storage (memory or file) that is designated for information received from VPLS-Nodes. This copy is the information received. The parsed information is read along with other information from Config File 213 or other areas to correctly convert the parsed information to the other side, in this case EVPN readable control information. The converted information is written in an area of storage (in memory or file on disk) designated as EVPN-Out 215. The information in EVPN-Out 215 should be distributed to EVPN nodes. Vice-Versa for EVPN to VPLS translation. What is actually stored? For the VPLS-IN or EVPN-IN, as disclosed herein, it may be the information in the route received from VPLS or EVPN nodes respectively. For the VPLS-Out 218 or EVPN-Out 215, it is the route to be distributed to the VPLS or EVPN nodes respectively. As a note, the route reflectors within SDN-Mapper 200 (in this method and other methods) may just advertise directly to each network device their particular route. Many route reflectors in conventional operations advertise all routes to each device. For the programmatic approach, there is also a similar direct advertisement of routes to individual EVPN nodes. The information stored is the same. The format or syntax how it is stored may differ.

At step 304, based on the information of VPLS-In 214, control logic 210 acts on changes. Changes here refers to the state of the data store. For example, in some implementation, it is possible to program the data store such that when an entry is added to the data store, it triggers a series of programmatic action. Likewise when an entry is being deleted from the data store. For example, there is initial no entry in the data store area VPLS-In 214. When an entry is added to the VPLS-In 214 area of the data Store, it may trigger a series of programmatic actions to go read the information in this new entry, search the configuration file, find a match against the route target, convert the information of VPLS-In 214 entry to correct information for writing to EVPN-Out 215 area of the data store. Then creates a new entry or updates an existing entry in the EVPN-Out 215 area of the data Store. Now since there is a change of state in EVPN-Out 215 area of the data store, this in turn may trigger a series of programmatic actions to read this information in EVPN-Out 215 and format it into an EVPN route for advertisement to the EVPN nodes.

At step 305, control logic 210 uses the information of config file 213 for translating VPLS-In 214 Information (e.g., step 304) to EVPN information (e.g., label value for each EVPN-Node to use to send directly to the VPLS-Node) and writes the information into EVPN-Out 215 datastore. At step 306, based on determining a change with EVPN-Out 215 datastore (e.g., update of information in step 305), RR 209 is notified to act on the changes (e.g., subsequent step 307). At step 307, RR 209 processes the information of EVPN-Out 215 and advertises as BGP-EVPN Type3 (PMSI Label) to each EVPN Node, which is unique to each EVPN Node. In a first example, RR 209 sends a message to RTX of E204 to use PMSI label 1113 with a next hop of V201. The EVPN would be associated with Type3 and the equation would be E204=1111(Label Base from V201)+3 (VE-ID233 for E204 in Config File 213)−1 (Offset from V201)=1113. In a second example, RR 209 sends a message to RTX of E206 to use PMSI label 1113 with a next hop of V201. The EVPN would be associated with Type3 and the equation would be E206=1111(Label Base from V201)+4 (VE-ID234 for E206 in Config File 213)−1 (Offset from V201)=1114. At step 308, cross pseudowires can now be built from EVPN to VPLS for BUM. Steps like steps 301-308 may be executed for each route target (RT) on each VPLS node. Route Target (RT) is a large integer number usually represented as AS:RT. The Route Target is mechanism a route identifies all the information belonging to a VPN. Essentially, each VPN (e.g., associated with different customers) is uniquely identified by this number. It should be understood that the information that is mapped is unique for each node. Since the VPLS node and EVPN node are expecting the correct information, it is the responsibility of the SDN-Mapper 200 to correctly adjust the information before sending it to the VPLS node or EVPN node.

FIG. 3A illustrates an exemplary method for SDN-Mapper Label Advertisement translation to enable pseudowires for VPLS to EVPN (PMSI). FIG. 3B illustrates an exemplary network in which the method of FIG. 3A (and further disclosed below) may be implemented. This method may work in conjunction with the method of FIG. 2A and FIG. 2B.

With reference to FIG. 3A and FIG. 3B, at step 321, E204 (e.g., a network device) advertises Type3 Discovery Route with PMSI PW Label to EVPN-RR 216 and RR 209 in SDN Mapper 200 for RTX. At step 322, EVPN-RR 216 propagates to all EVPN nodes and PMSI PWs among EVPN nodes (e.g., E204, E205, E206) are built as usual for RTX. At step 323, RR 209 parse route and store info into EVPN-In 217 internal datastore (e.g., a section of memory). At step 324, "EVPN-In 217" notifies control logic 210 to act on changes. At step 325, control logic 210 uses info in config file 213 and VPLS-In 214 to translate EVPN-In 217 information and writes into VPLS-Out 218 datastore (e.g., a section of memory). At step 326, VPLS-Out 218 datastore changes triggers RR 208 to act on updates. At step 327, RR 208 processes the VPLS-Out 218 and VPLS route adjusted for each VPLS node (e.g., update message separately to V201, V202, V203). In a first example, RR 208 sends a message to RTX of V201 with the route. The equation would be V201=2111(from E204)−1 (VE-ID231 for V201 in VPLS-IN 214)+1 (Offset Calc from Config File 213)=2111. Similar steps are taken with V203 and V202. The equation for V203=2111(E204)−5 (VE-ID235 for V203 in VPLS-IN 214)+1 (Offset Calc from Config File 213)=2107. And the equation for V202=2111(E204)−2 (VE-ID232 for V202 in VPLS-IN 214)+1 (Offset Calc from Config File 213)=2110. At step 328, cross pseudowires may now be built from VPLS nodes to EVPN nodes PMSI for BUM. At step 329, EVPN unicast label value may be sent for everything.

Figure 4A:
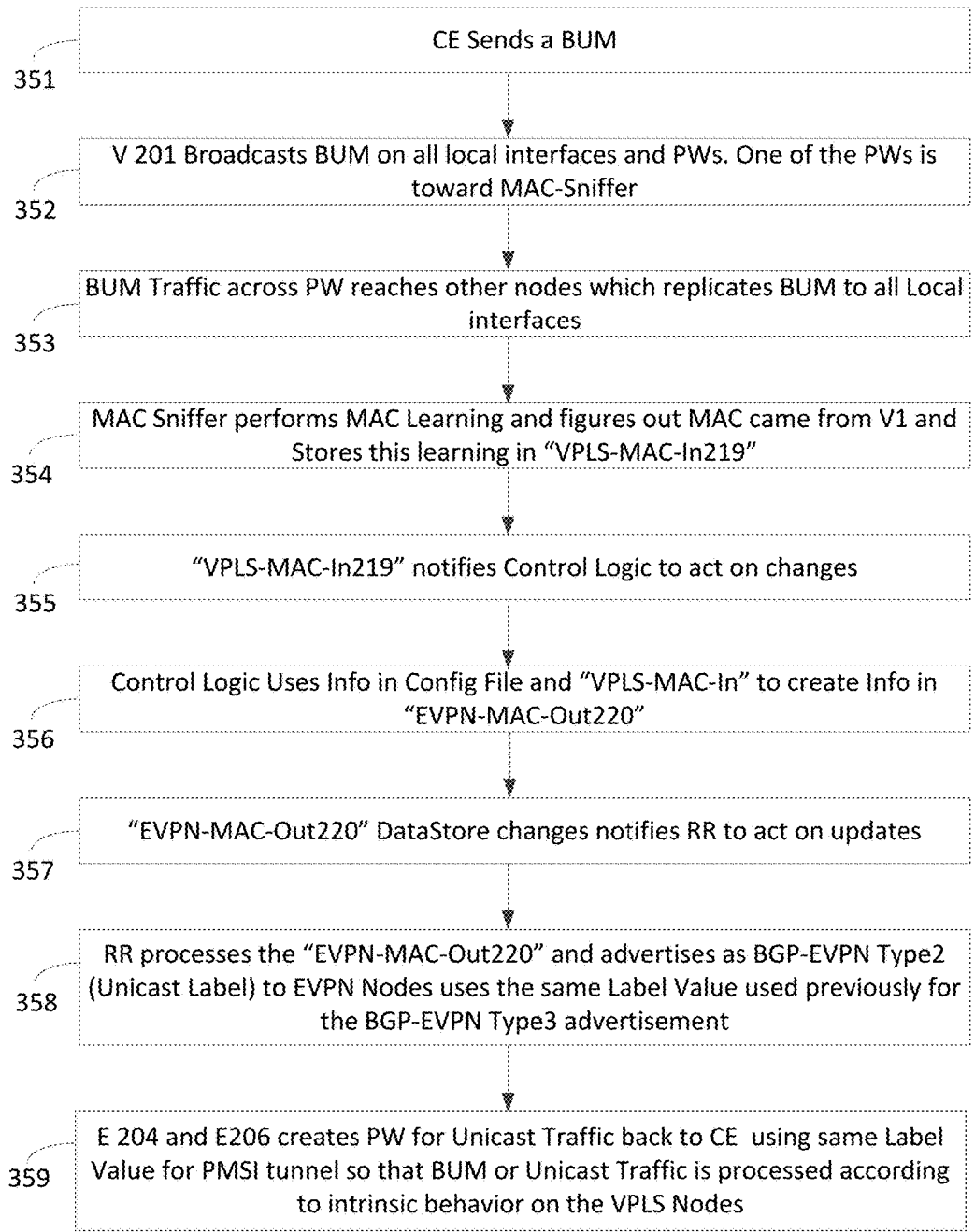
FIG. 4A illustrates an exemplary method for SDN-Mapper Translatation VPLS MAC Learning to EVPN Type2 MAC Routes.
Figure 4B:
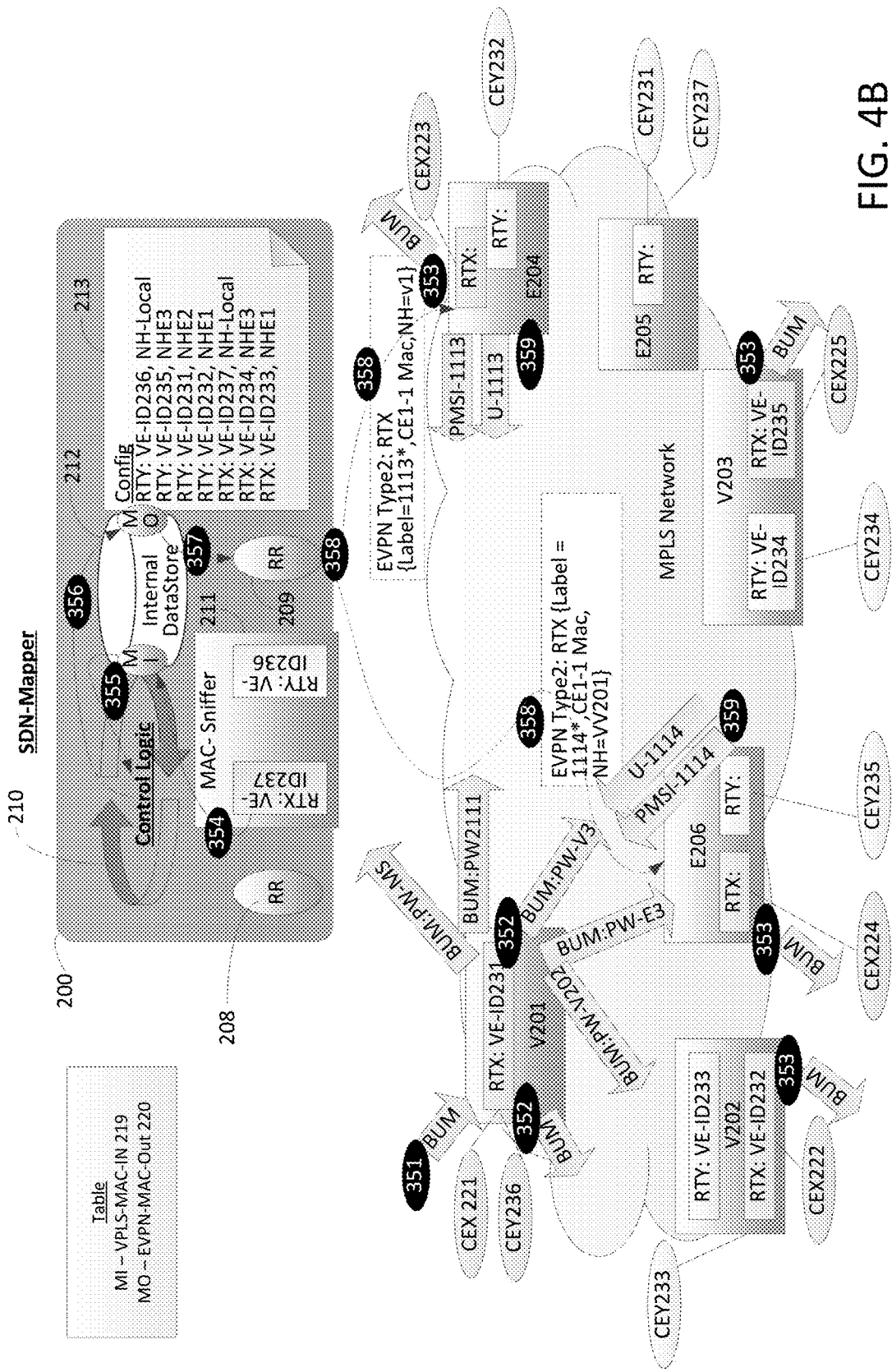
FIG. 4B illustrates an exemplary network in which the method of FIG. 4A (and further disclosed below) may be implemented.

FIG. 4A illustrates an exemplary method for SDN-Mapper Translation VPLS MAC Learning to EVPN Type2 MAC Routes. FIG. 4B illustrates an exemplary network in which the method of FIG. 4A (and further disclosed below) may be implemented. At step 351, CEX 221 sends a BUM. At step 352, V201 may broadcast BUM on all available local interfaces and PWs. One of the PWs is toward MAC-Sniffer 211. At step 353, BUM traffic across PW reaches other nodes, which replicates BUM to all available local interfaces. At step 354, MAC Sniffer 211 performs MAC learning and figures out MAC came from V201 and stores this learning in VPLS-MAC-In 219. At step 355, VPLS-MAC-In 219 notifies control logic 210 to act on changes. At step 356, control logic uses information in Config File 213 and VPLS-MAC-In 219 to create information in EVPN-MAC-Out 220. At step 357, EVPN-MAC-Out 220 datastore changes triggers RR 209 to act on updates. At step 358, RR 209 processes the EVPN-MAC-Out 220 and advertises as BGP-EVPN Type2 (Unicast Label) to EVPN Nodes uses the same label value used previously for the BGP-EVPN Type3 advertisement. For example, Type2 for E204: {Label=1113, CEX221 MAC} and Type2 for E206: {Label=1114, CEX 221 MAC}. At step 359, E204 and E206 may create PW for unicast traffic back to CEX 221 using same label value for PMSI tunnel so that BUM or unicast traffic is processed according to intrinsic behavior on the VPLS Nodes.

Figure 5A:
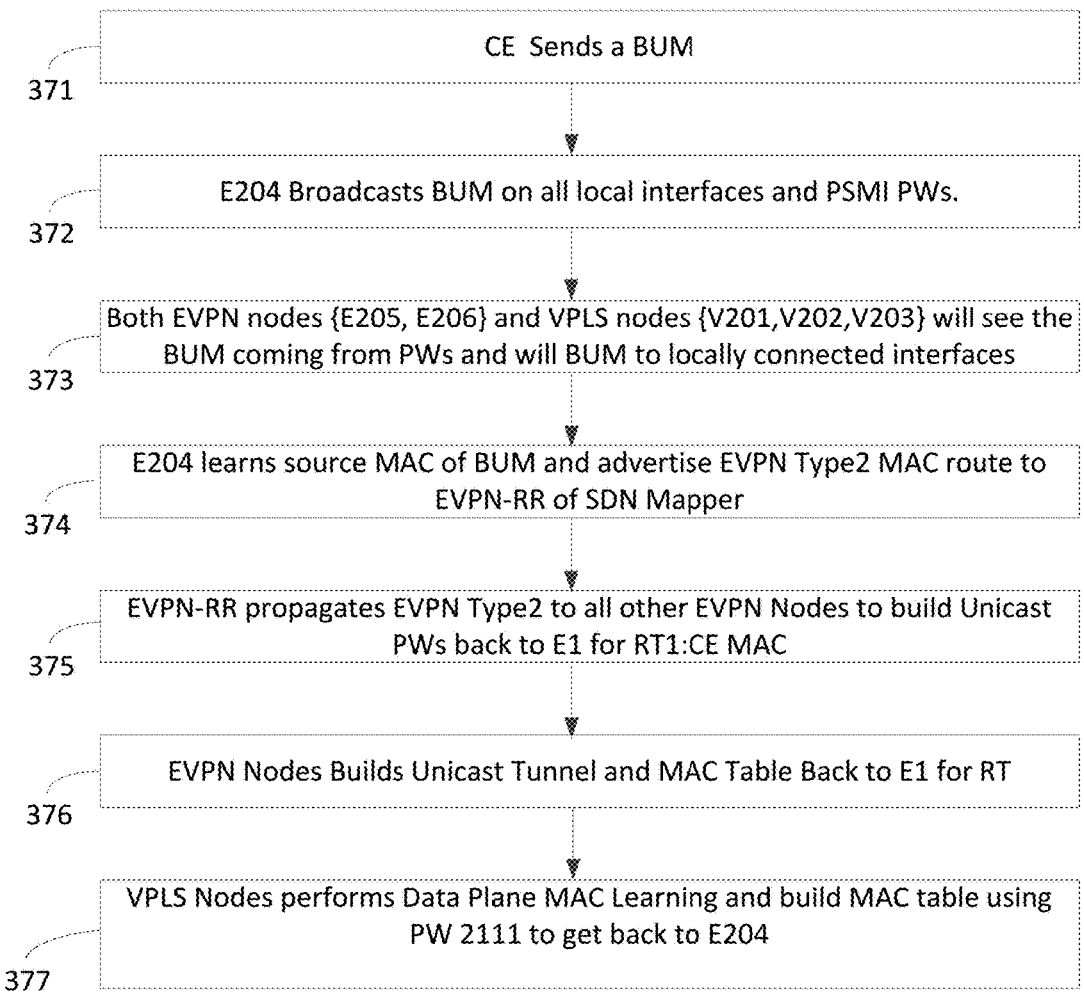
FIG. 5A illustrates an exemplary method for BUM Traffic Coming from CE's connected to EVPN Nodes.
Figure 5B:
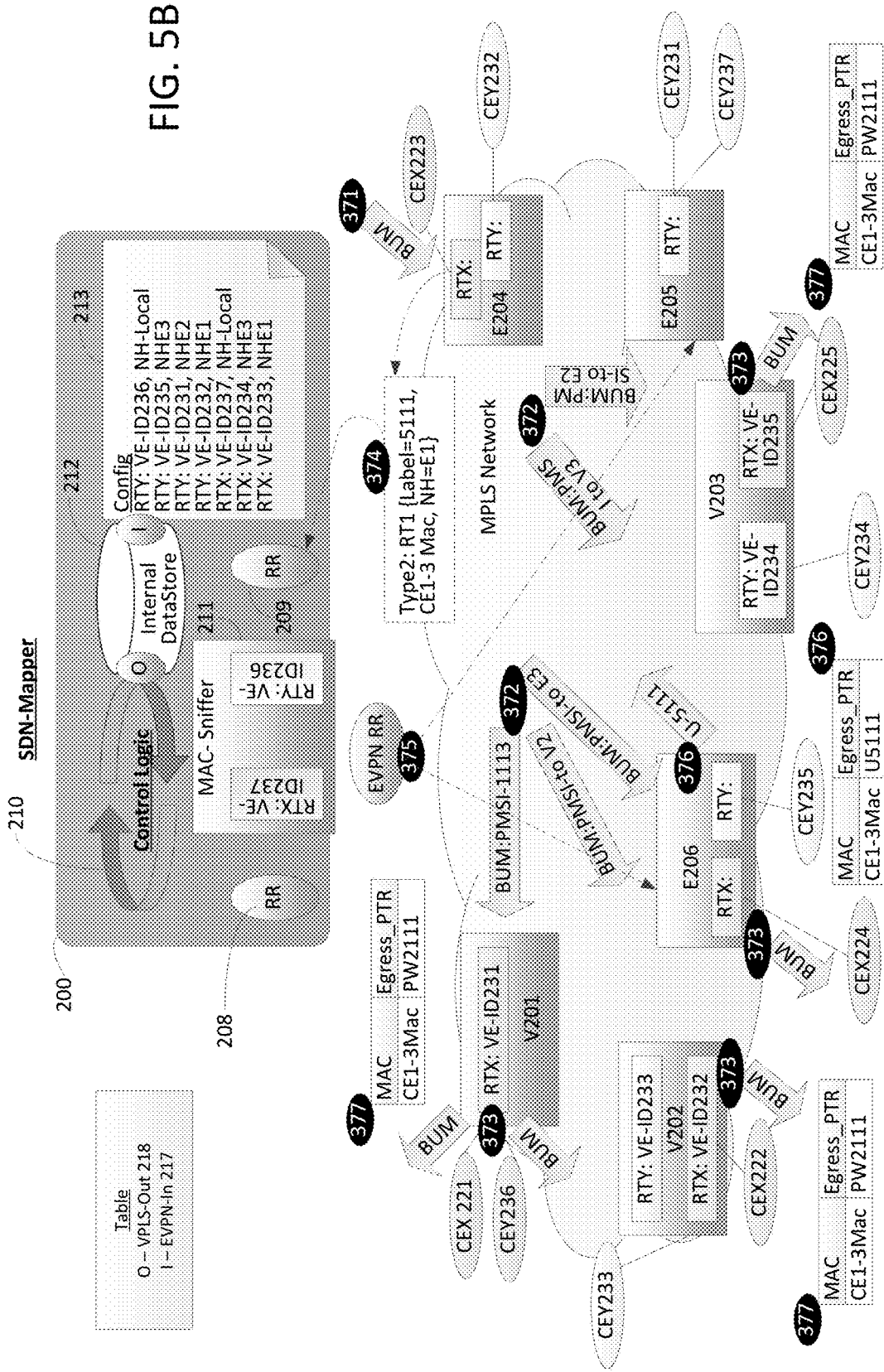
FIG. 5B illustrates an exemplary network in which the method of FIG. 5A may be implemented.
Figure 6A:
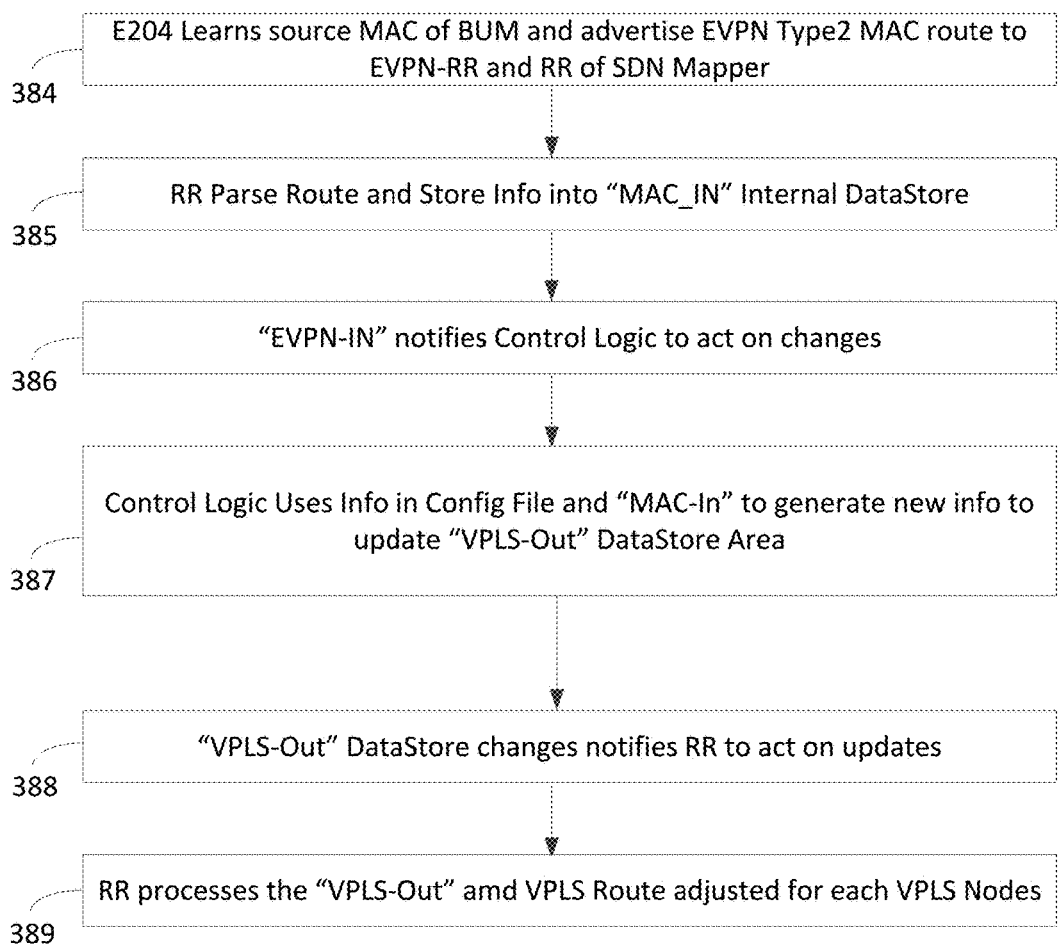
FIG. 6A illustrates an exemplary method for SDN-Mapper Translatation EVPN Type2 MAC Routes to BGP-VPLS pseudo wire Label update.
Figure 6B:
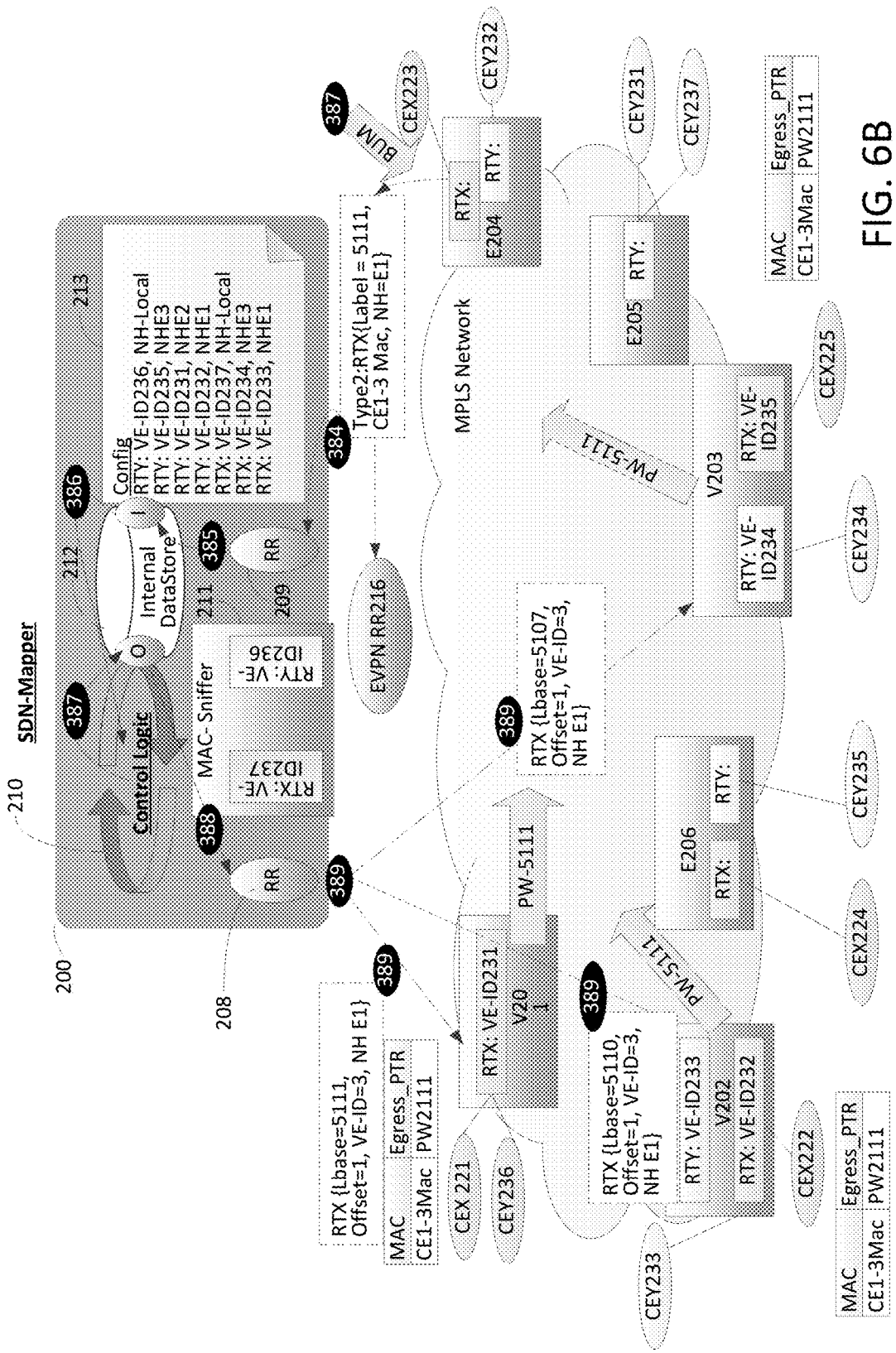
FIG. 6B illustrates an exemplary network in which the method of FIG. 6A may be implemented.

FIG. 5A illustrates an exemplary method for BUM Traffic Coming from CE's connected to EVPN Nodes. FIG. 5B illustrates an exemplary network in which the method of FIG. 5A (and further disclosed below) may be implemented. At step 371, CEX 223 sends a BUM. At step 372, E204 may broadcast BUM on all available local interfaces and PSMI PWs. At step 373, both EVPN nodes (e.g., E205,E206) and VPLS nodes (e.g., V201,V202, V203) may determine that the BUM is coming from PWs and will BUM to locally connected interfaces. At step 374, E204 learns source MAC of BUM and may advertise EVPN Type2 MAC route to EVPN-RR 216 and RR 209 of SDN-Mapper 200. At step 375, EVPN-RR 216 propagates EVPN Type2 to the other EVPN Nodes to build unicast PWs back to E204 for RTX: CEX223 MAC. At step 376, EVPN Nodes build unicast tunnel and MAC table back to E204 for RTX. At step 377, VPLS nodes (e.g., V201,V202, V203) may perform data plane MAC learning and may build MAC table using PW 2111 to get back to E204. If unicast traffic is sent to E204 using PW2111, which is the PMSI Label advertised by E204, the E204 may be replicated to all connected interfaces for that RT, which is not the desired behavior. SDN-Mapper 200 should advertise new label to use for PW back to E204 for both unicast and multicast Traffic. See FIG. 6A and FIG. 6B for additional methods that may address this issue.

FIG. 6A illustrates an exemplary method for SDN-Mapper Translation EVPN Type2 MAC Routes to BGP-VPLS pseudo wire Label update. FIG. 6B illustrates an exemplary network in which the method of FIG. 6A (and further disclosed below) may be implemented. Consider the following steps in view of step 374-step 377 of FIG. FIG. 5A and FIG. 5B. At step 384, E204 Learns source MAC of BUM and may advertise EVPN Type2 MAC route to EVPN-RR 216 and RR 209 of SDN Mapper. At step 385, RR 209 may parse route and store information into EVPN-In 217 (which is a "MAC-IN") internal datastore. "EVPN-In 217" notifies control logic 210 to act on changes. Control logic 210 uses info in Config File 213 and EVPN-In 217 to generate new info to update VPLS-Out 218 datastore Area. Note, by now, the VPLS Nodes would have completed MAC Learning and built MAC tables as shown in FIG. FIG. 5A.

With continued reference to FIG. 6A and FIG. 6B, at step 388, VPLS-Out 218 datastore changes triggers RR 208 to act on updates. At step 389, RR 208 processes the VPLS-Out 218 and VPLS route adjusted for each VPLS Node. For V201=5111(from E204)−1 (VE-ID231 for V201 in VPLS-IN 214)+1 (Offset Calc from Config File 213)=5111. For V203=5111(E204)−5 (VE-ID235 for V203 in VPLS-IN 214)+1 (Offset Calc from Config File 213)=5107. For V202=5111(E204)−2 (VE-ID232 for V202 in VPLS-IN 214)+1 (Offset Calc from Config File 213)=5110. Note that the new PW advertisement may flush out the MAC learned previously or update to PW-5111. This depends on vendor implementation on VPLS nodes.

The disclosed subject matter may be viewed in the following manner in some aspects: using a network controller to obtain a control message that is advertised from a first node of a first network VPN service; parse for first information in the control message, the first information comprising control information associated with routing data messages to the first node; and converting the first information to second information, wherein the second information comprises control information for forwarding data messages of a second network VPN service to the first node and wherein the first network VPN service is not natively compatible with the second network VPN service (e.g., EVPN versus VPLS). A VPN service may be considered a multi-point layer 2 VPN or the like.

To understand the distinction of the SDN-Mapper 200 solution with other solutions, disclosed below are considerations about some differences between the two technologies of BGP-VPLS and EVPN-MPLS and an overview of different possible solutions to interwork the two technologies BGP-VPLS is different in that the TX-egress node signals to each RX-Ingress node a unique label value to use to forward the traffic via a single common BGP-VPLS route update. When an MPLS packet arrives, the TX-egress can identify the VPN the packet belongs to and which RX-ingress it came from. This is referred to herein as ingress-based pseudowires or label assignment. This distinction makes data plane learning and route propagation via route reflectors possible. How the pseudowire mesh is built to achieve the functional objective specified above may be accomplished through the following components: 1) BGP-VPLS Route advertised by TX-Egress; 2) Locally Configured Site ID for the VPN on RX-Ingress; and 3) Formula to calculate Label Value for the PW from RX-Ingress ({RX-Ingress PW Label=Rc'd LabelBase+Locally Config SiteID−Rc'd Offset}). Table 3 provides a functional overview of BGP-VPLS and corresponding tasks.

TABLE 3

| BGP-VPLS | |
|---|---|
| Functional Overview | Description of Task |
| Control Plane | TX-Egress Nodes use BGP-VPLS to signal RX-Ingress how to build pseudowires (PW). |
| Data Plane Construction | RX-Ingress Nodes build the pseudowire mesh to TX-Egress Nodes. Same PW used for BUM and Unicast traffic. |
| MAC Learning via Data Plane | RX-Ingress and TX-Egress Sniff Source MAC addresses coming over connected interfaces or pseudowires to construct and refresh MAC Table |
| Data Plane Forwarding | RX-Ingress transmits unicast packets matching MAC Table over single PW and refresh MAC timer in table. TX-Egress transmits unicast packets matching the MAC Table to local interface and refresh MAC timer. RX-Ingress broadcasts BUM (Broadcast UnknownUnicast Multicast) packets over all PWs. TX-Egress broadcasts BUM (Broadcast UnknownUnicast Multicast) packets over all local connected interfaces |

With continued reference with regard to BGP-VPLS, in the LAN, the destination MAC address is the key used to forward packets. Once the pseudowire mesh is built, data plane learning is used to build the MAC tables for the VPN on each node following these rules: A) RX-Ingress nodes to sniff the Source MAC to figure which local interface the Source MAC originates to build or refresh local MAC tables; B) RX-Ingress nodes broadcast BUM on all pseudowires connected to the VPN; C) TX-Egress nodes sniff the Source MAC to figure out the RX-Ingress that sources the MAC to build or refresh remote MAC tables; and D) TX-Egress nodes broadcast BUM on all locally connected interface associated with the VPN. Once the MAC tables are built, Unicast packets are forwarded directly to the TX-Egress using the specific pseudowire.

Table 4 provides a functional overview of EVPN-MPLS and corresponding tasks. EVPN is a newer technology that was developed to support a number of different use cases within a similar technological framework as BGP-VPLS. One of the use cases for EVPN includes the multipoint virtual private LAN service (multipoint VPLS) over a wide area network. Not only does EVPN provide the capabilities that were covered in the BGP-VPLS technology, but it also specifies how to support all-active and active-backup scenarios, which was lacking in the original BGP-VPLS specifications. As disclosed herein, a problem is that EVPN technology and BGP-VPLS technology have significant differences. Conventional methods do not provides how it may be possible to interwork a native BGP-VPLS box with a native EVPN box. In other solutions (e.g., non-SDN-Mapper solutions) there is usually two-distinct boundaries of the service overlay networks (VPLS overlay versus EVNP overlay). In a first example, there may be a back-to-back gateway (VPLS gateway connected with an EVPN gateway), with two distinct service networks overlayed on a common MPLS network. To bridge the service across these two overlay networks, there is a demuxing to customer VLANs at the gateways to cross over as a physical connection to the gateway on the other network. In this first example, customer traffic flows through the gateways. This first example may be integrated into a single box, in which an external physical connection is not needed, just logical connections. In a second example solution, there may be bilingual nodes (e.g., devices that speak VPLS and EVPN) in one of the overlay networks (e.g., the EVPN nodes speak EVPN and VPLS).

TABLE 4

EVPN-MPLS

| Functional Overview | Description of Task |
|---|---|
| Control Plane | TX-Egress Nodes use BGP-EVPN to signal RX-Ingress how to build Egress-Based pseudowires for Unicast traffic and different Egress-Based pseudowires for BUM traffic, which are called PMSI-PW. |
| Data Plane Construction | RX-Ingress Nodes build the Engress-Based pseudowires for Unicast and different Egress-Based PMSI pseudowires for BUM to TX-Egress Nodes. |
| MAC Learning and Distribution via BGP | RX-Ingress Sniff Source MAC addresses coming over connected interfaces, and send the MAC routes in a BGP Update as needed to all Nodes |
| Data Plane Forwarding | RX-Ingress transmit unicast packets matching MAC Table over single U-PW and refresh MAC timer in table. TX-Egress transmit unicast packets matching the MAC Table to local interface and refresh MAC timer. RX-Ingress broadcasts BUM (Broadcast UnknownUnicast Multicast) packets over all PSMI-PWs. |

TABLE 4-continued

EVPN-MPLS

| Functional Overview | Description of Task |
|---|---|
| | TX-Egress broadcasts BUM (Broadcast UnknownUnicast Multicast) packets received on PMSI-PW over all local connected interfaces |

Figure 7:
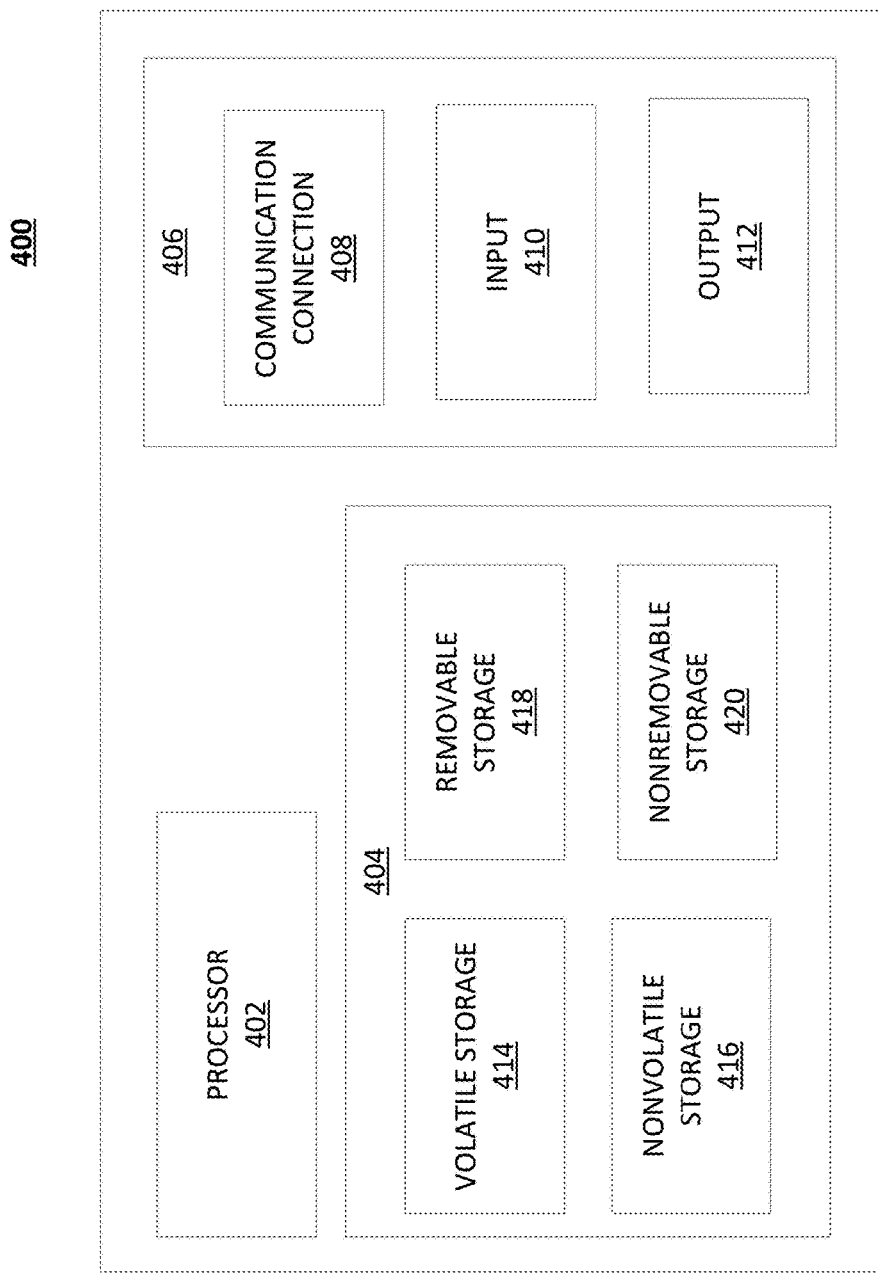
FIG. 7 illustrates a schematic of an exemplary network device.

FIG. 7 is a block diagram of network device 400 that may be connected with or comprise a component of MPLS network 190. Network device 400 may comprise hardware or a combination of hardware and software. The functionality to facilitate telecommunications via a telecommunications network may reside in one or combination of network devices 400. Network device 400 depicted in FIG. 7 may represent or perform functionality of an appropriate network device 400, or combination of network devices 400, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 7 is exemplary and not intended to imply a limitation to a specific implementation or configuration. Thus, network device 400 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 400 may comprise a processor 402 and a memory 404 coupled to processor 402. Memory 404 may contain executable instructions that, when executed by processor 402, cause processor 402 to effectuate operations associated with mapping wireless signal strength. As evident from the description herein, network device 400 is not to be construed as software per se.

In addition to processor 402 and memory 404, network device 400 may include an input/output system 406. Processor 402, memory 404, and input/output system 406 may be coupled together (coupling not shown in FIG. 7) to allow communications between them. Each portion of network device 400 may comprise circuitry for performing functions associated with each respective portion. Thus, each portion may comprise hardware, or a combination of hardware and software. Accordingly, each portion of network device 400 is not to be construed as software per se. Input/output system 406 may be capable of receiving or providing information from or to a communications device or other network entities configured for telecommunications. For example input/output system 406 may include a wireless communications (e.g., 3G/4G/GPS) card. Input/output system 406 may be capable of receiving or sending video information, audio information, control information, image information, data, or any combination thereof. Input/output system 406 may be capable of transferring information with network device 400. In various configurations, input/output system 406 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 406 may comprise a Wi-Fi finder, a two-way GPS chipset or equivalent, or the like, or a combination thereof.

Input/output system 406 of network device 400 also may contain a communication connection 408 that allows network device 400 to communicate with other devices, network entities, or the like. Communication connection 408 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 406 also may include an input device 410 such as keyboard, mouse, pen, voice input device, or touch input device. Input/output system 406 may also include an output device 412, such as a display, speakers, or a printer.

Processor 402 may be capable of performing functions associated with telecommunications, such as functions for processing broadcast messages, as described herein. For example, processor 402 may be capable of, in conjunction with any other portion of network device 400, determining a type of broadcast message and acting according to the broadcast message type or content, as described herein.

Memory 404 of network device 400 may comprise a storage medium having a concrete, tangible, physical structure. As is known, a signal does not have a concrete, tangible, physical structure. Memory 404, as well as any computer-readable storage medium described herein, is not to be construed as a signal. Memory 404, as well as any computer-readable storage medium described herein, is not to be construed as a transient signal. Memory 404, as well as any computer-readable storage medium described herein, is not to be construed as a propagating signal. Memory 404, as well as any computer-readable storage medium described herein, is to be construed as an article of manufacture.

Memory 404 may store any information utilized in conjunction with telecommunications. Depending upon the exact configuration or type of processor, memory 404 may include a volatile storage 414 (such as some types of RAM), a nonvolatile storage 416 (such as ROM, flash memory), or a combination thereof. Memory 404 may include additional storage (e.g., a removable storage 418 or a non-removable storage 420) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 400. Memory 404 may comprise executable instructions that, when executed by processor 402, cause processor 402 to effectuate operations to map signal strengths in an area of interest.

Figure 8:
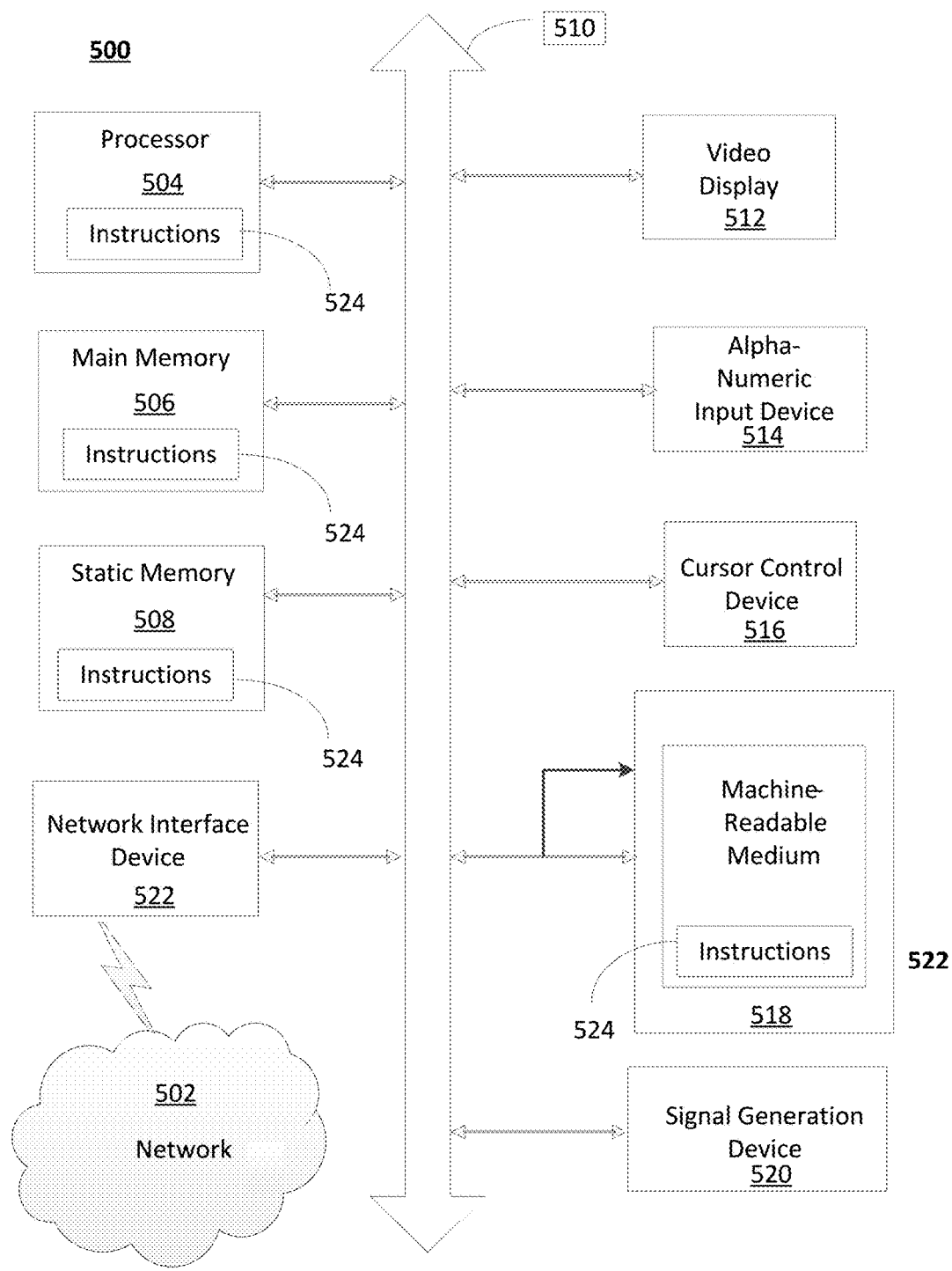
FIG. 8 illustrates an exemplary communication system that provides wireless telecommunication services over wireless communication networks.

FIG. 8 depicts an exemplary diagrammatic representation of a machine in the form of a computer system 500 within which a set of instructions, when executed, may cause the machine to perform any one or more of the methods described above. One or more instances of the machine can operate, for example, as processor 402, SDN-Mapper 200, V201, E204, CEX 221, CEY231, and other devices of FIG. 1A, FIG. 2B, FIG. 3B, FIG. 4B, FIG. 5B, or FIG. 6B. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system wherein management and control utilizing a software designed network (SDN) and interworking are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which EVPN and VPLS Interworking may processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—EVPN and VPLS Interworking—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A software-defined network (SDN) controller comprising:
   a processor; and
   a memory coupled with the processor, the memory comprising executable instructions that when executed by the processor cause the processor to effectuate operations comprising:
      obtaining a control message that is advertised from a border gateway protocol-virtual private local area network service (BGP-VPLS) node;
      parsing for first information in the control message, the first information comprising control information associated with routing data messages to the BGP-VPLS node; and
      converting the first information to second information, the second information comprising control information for forwarding Ethernet virtual private network (EVPN) data messages to the BGP-VPLS node.

2. The SDN controller of claim 1, further operations comprising sending the second information to an EVPN node, the EVPN node comprising an EVPN route reflector.

3. The SDN controller of claim 1, further operations comprising sending the second information to an EVPN node, the EVPN node comprising an EVPN router.

4. The SDN controller of claim 1, wherein the first information in the control message comprises a route target attribute or next-hop.

5. The SDN controller of claim 1, wherein the first information in the control message comprises an offset.

6. The SDN controller of claim 1, wherein the second information comprises a label value.

7. A software-defined network (SDN) controller comprising:
   a processor; and
   a memory coupled with the processor, the memory comprising executable instructions that when executed by the processor cause the processor to effectuate operations comprising:
      obtaining a control message that is advertised from an Ethernet virtual private network (EVPN);
      parsing for first information in the control message, the first information comprising control information associated with routing data messages to the EVPN node; and
      converting the first information to second information, the second information comprising control information for forwarding border gateway protocol-virtual private local area network service (BGP-VPLS) node data messages to the EVPN node.

8. The SDN controller of claim 7, further operations comprising sending the second information to a BGP-VPLS node, the BGP-VPLS node comprising a BGP-VPLS route reflector.

9. The SDN controller of claim 7, further operations comprising sending the second information to a BGP-VPLS node, the BGP-VPLS node comprising a BGP-VPLS router.

10. The SDN controller of claim 7, wherein the first information in the control message comprises a label.

11. The SDN controller of claim 7, wherein the first information in the control message comprises a discovery route.

12. The SDN controller of claim 7, wherein the BGP-VPLS node communicates the data message over a multi-protocol data-switching network.

13. The SDN controller of claim 1, the operations further comprising sniffing MAC addresses that are used for the converting the first information to second information.

14. A system comprising:
   a border gateway protocol-virtual private local area network service (BGP-VPLS) node; and
   a software-defined network (SDN) controller communicatively connected with the BGP-VPLS node, the SDN controller comprising:
      a processor; and
      a memory coupled with the processor, the memory comprising executable instructions that when executed by the processor cause the processor to effectuate operations comprising:
         obtaining a control message that is advertised from the BGP-VPLS node;
         parsing for first information in the control message, the first information comprising control information associated with routing data messages to the BGP-VPLS node; and
         converting the first information to second information, the second information comprising control information for forwarding Ethernet virtual private network (EVPN) data messages to the BGP-VPLS node.

15. The system of claim 14, further operations comprising sending the second information to an EVPN node, the EVPN node comprising an EVPN route reflector.

16. The system of claim 14, further operations comprising sending the second information to an EVPN node, the EVPN node comprising an EVPN router.

17. The system of claim 14, wherein the first information in the control message comprises a route target attribute or next-hop.

18. The system of claim 14, wherein the first information in the control message comprises an offset.

19. The system of claim 14, wherein the second information comprises a label value.

* * * * *

UNITED STATES PATENT AND TRADEMARK OFFICE
CERTIFICATE OF CORRECTION

PATENT NO. : 10,447,499 B2
APPLICATION NO. : 15/727250
DATED : October 15, 2019
INVENTOR(S) : James Uttaro et al.

Page 1 of 1

It is certified that error appears in the above-identified patent and that said Letters Patent is hereby corrected as shown below:

In the Claims

Claim 13, Column 17, Line 16, delete "claim 1" insert -- claim 7 --.

Signed and Sealed this
Tenth Day of November, 2020

Andrei Iancu
*Director of the United States Patent and Trademark Office*